United States Patent
Gorra

(10) Patent No.: US 6,936,104 B2
(45) Date of Patent: Aug. 30, 2005

(54) APPLICATOR PAD FOR USE WITH AN APPARATUS FOR APPLYING A FLUID TO THE TIRES OF A VEHICLE

(75) Inventor: William M. Gorra, West Hartford, CT (US)

(73) Assignee: Simoniz USA, Inc., Bolton, CT (US)

( * ) Notice: Subject to any disclaimer, the term of this patent is extended or adjusted under 35 U.S.C. 154(b) by 499 days.

(21) Appl. No.: 10/164,170

(22) Filed: Jun. 5, 2002

(65) Prior Publication Data

US 2002/0192389 A1 Dec. 19, 2002

Related U.S. Application Data

(63) Continuation of application No. 09/565,798, filed on May 5, 2000, now Pat. No. 6,461,429.

(51) Int. Cl.$^7$ ................................................. B05C 1/06
(52) U.S. Cl. ...................... 118/264; 118/265; 118/266; 134/45; 134/123; 15/53.4
(58) Field of Search ................................ 118/304, 264, 118/265, 266; 134/45, 123; 427/428, 429; 15/53.4, 97.3

(56) References Cited

U.S. PATENT DOCUMENTS

| | | | | |
|---|---|---|---|---|
| 2,319,873 A | * | 5/1943 | Linz ........................... | 15/244.4 |
| 4,203,857 A | * | 5/1980 | Dugan ...................... | 15/104.93 |
| 4,694,523 A | | 9/1987 | Van Brakel | |
| 4,958,587 A | | 9/1990 | Fogal, Sr. et al. | |
| 4,962,721 A | * | 10/1990 | Peek .......................... | 118/209 |
| 4,968,166 A | | 11/1990 | Ingram | |
| 5,052,629 A | | 10/1991 | Belanger et al. | |
| 5,123,136 A | | 6/1992 | Belanger et al. | |
| 5,125,981 A | | 6/1992 | Belanger et al. | |
| 5,728,220 A | * | 3/1998 | Curcuri et al. .............. | 118/324 |
| 6,260,225 B1 | | 7/2001 | Bowman | |
| 6,461,429 B1 | | 10/2002 | Gorra | |
| 6,461,685 B2 | | 10/2002 | Gorra | |

* cited by examiner

*Primary Examiner*—Laura Edwards
(74) *Attorney, Agent, or Firm*—McCormick, Paulding & Huber LLP

(57) ABSTRACT

A vehicle tire dressing apparatus according to the present invention comprises left and right dressing applicators situated alongside a vehicle conveying track, the dressing applicators being moveable individually into contacting engagement with tires on left and right sides of a vehicle in the track. Each applicator has an applicator pad mounted to a mount bar and the mount bar is hinged to a frame which allows articulation of the applicator pad into and out of contact with the tires. The applicator pad is configured with a plurality of orifices, each of which orifices receives fluid sprayed from a complimentary spray nozzle. Each orifice has an elongated capillary which assists dispersing fluid into the pad. The spray nozzles emit fluid into the pads for a predetermined amount of time, the spraying being initiated by movement of the vehicle into proximity with the tire dressing assembly.

22 Claims, 5 Drawing Sheets

APPLICATOR PAD FOR USE WITH AN APPARATUS FOR APPLYING A FLUID TO THE TIRES OF A VEHICLE

CROSS REFERENCE TO RELATED APPLICATION

This application is a continuation of U.S. patent application Ser. No. 09/565,798, filed May 5, 2000 entitled "VEHICLE TIRE DRESSING APPLICATOR AND METHOD FOR ITS USE" now U.S. Pat. No. 6,461,429. Applicant claims priority of the above-identified parent application which is incorporated herein by reference.

BACKGROUND OF THE INVENTION

1. Technical Field

This invention pertains generally to apparatus for applying a fluid to vehicle tires and, in particular, to an applicator or pad for use with an apparatus for automatically applying a dressing fluid to the tires of a vehicle being conveyed within an automatic vehicle facility.

2. Background Art

It is well known in the vehicle washing industry to perform various automated steps during the vehicle washing process as the vehicle is conveyed through a washing facility. Over the years, numerous advances to such washing facilities have expedited and improved the washing process while decreasing the manpower requirements of the facility. For instance, the development of a cost-efficient, effective air drying system for vehicles eliminated the need to dry vehicles manually after the washing procedure is completed.

Historically, patrons to vehicle washing facilities have had the option of paying an additional fee and having a dressing fluid applied to the vehicle tires near the exit of the washing facility. The dressing fluid, which can be either water-or solvent-based, is applied directly to the tires to improve their appearance and provide a finishing touch to the exterior of the vehicle. There are various known methods for applying tire dressing fluids, none of which have successfully eliminated or even reduced manpower requirements, or improved the efficiency with which the dressing fluids are consumed by the washing facility.

One method of dressing vehicle tires is by manually applying the dressing as the vehicle approaches the washing facility exits or when the car has been moved outside the washing facility. This method is inherently costly and labor intensive, as an attendant must apply the fluid manually to each tire. Understandably, there is difficulty in controlling the amount of tire dressing fluid that is used by the attendant. One attendant may apply the fluid liberally to an applicator pad or towel, while another attendant may not use enough fluid. The result is that patrons may receive inconsistent service, and the cost of the tire dressing service unnecessarily inflated to cover the cost of manpower and the dressing fluid consumed by the facility.

There have also been attempts to apply the dressing fluid automatically as the vehicle is prepared to exit the washing facility. Typically, one or more spray nozzles are used to spray fluid directly on the tires. While an automatic spraying device may eliminate the manual step of applying the fluid, spraying the tires automatically creates other problems.

Probably the worst problem is that the tires and wheels are usually sprayed together, so a large quantity of dressing fluid is wasted immediately when the wheels are sprayed. The tires must then be wiped to smooth any dripping fluid, and fluid must be removed completely from the wheels since the fluid can corrode certain types of wheels. As a result, instead of reducing manpower requirements by spraying tires with fluid, the amount of manual labor may actually be increased by the wiping requirements. There are also additional costs associated with products such as towels and gloves needed by the attendants to wipe down the tires and wheels.

Another problem with spraying tires with fluid is that the attendants who subsequently wipe the wheels and tires often do so outside the facility, which allows fluid to drip from the tires and wheels before the vehicle reaches the attendant. Especially in the winter, fluid on the ground may pose a hazard to patrons and employees walking over the dripped fluid. There may also be environmental concerns when dressing fluid drains from the washing facility property.

Still another problem with automatic tire spraying equipment is the result when the vehicle conveyor in the washing facility malfunctions. It is not infrequent that a vehicle jumps a roller or a stop on the conveyor which is used to pull the vehicle through the washing facility. The rollers or stops are typically linked to a pull chain driven and monitored by a computer control system. The computer control system tracks the location of the vehicle and controls the washing process by the locations of the roller or stop. If the vehicle is inadvertently moved away from the reference stop or roller and the computer controller does not recognize the move, the automatic spray equipment may miss the tires and possibly spray the vehicle body instead.

An apparatus is needed which effectively and efficiently applies a dressing fluid to vehicle tires in a vehicle washing facility. The present invention is directed to such an apparatus and a method for its use.

SUMMARY OF THE INVENTION

It is an object of the present invention to provide apparatus which automatically applies a dressing fluid to the tires of a vehicle that is being conveyed through a vehicle washing facility.

It is another object of the present invention to provide an apparatus which eliminates labor-intensive, manual tasks in applying tire dressing fluid to vehicle tires in a car washing facility.

It is yet another object of the present invention to provide an apparatus which applies a predetermined amount of tire dressing fluid to vehicle tires and avoid excessive product waste.

According to the present invention, a tire dressing assembly for applying dressing liquid to vehicle tires in a vehicle washing facility includes a pair of mechanical applicators which move an associated pair of applicator pads into contacting engagement with the tires as the vehicle is being conveyed in the washing facility. The applicator pads are soaked automatically with the dressing fluid via an arrangement of spray nozzles as the vehicle approaches the tire dressing assembly. A pair of adjustable hydraulic cylinders press the mechanical applicators and the soaked applicator pads against the tires to transfer the dressing fluid to the tires as the vehicle is conveyed through the tire dressing assembly.

According to one embodiment of the invention, the applicator pads have a concave contact surface that conforms to the shape of the tire sidewall.

According to another embodiment of the invention, the applicator pads have a convex contact surface that compresses when engaged with the tire sidewall.

One advantage of the present invention is the cost savings realized by automatically applying a dressing fluid to vehicle tires and eliminating labor-intensive, manual fluid application steps.

Another advantage of the present invention is the cost savings realized by efficiently controlling the amount of tire dressing fluid that is applied to vehicle tires.

Still yet another advantage of the present invention is that vehicles can be cleaned more efficiently in the washing facility by automatically applying tire dressing fluid.

These and other objects, features and advantages of the present invention will become more apparent in the light of the following detailed description of best mode embodiments thereof as illustrated in the accompanying drawings.

DESCRIPTION OF THE PREFERRED EMBODIMENT

Figure 1:
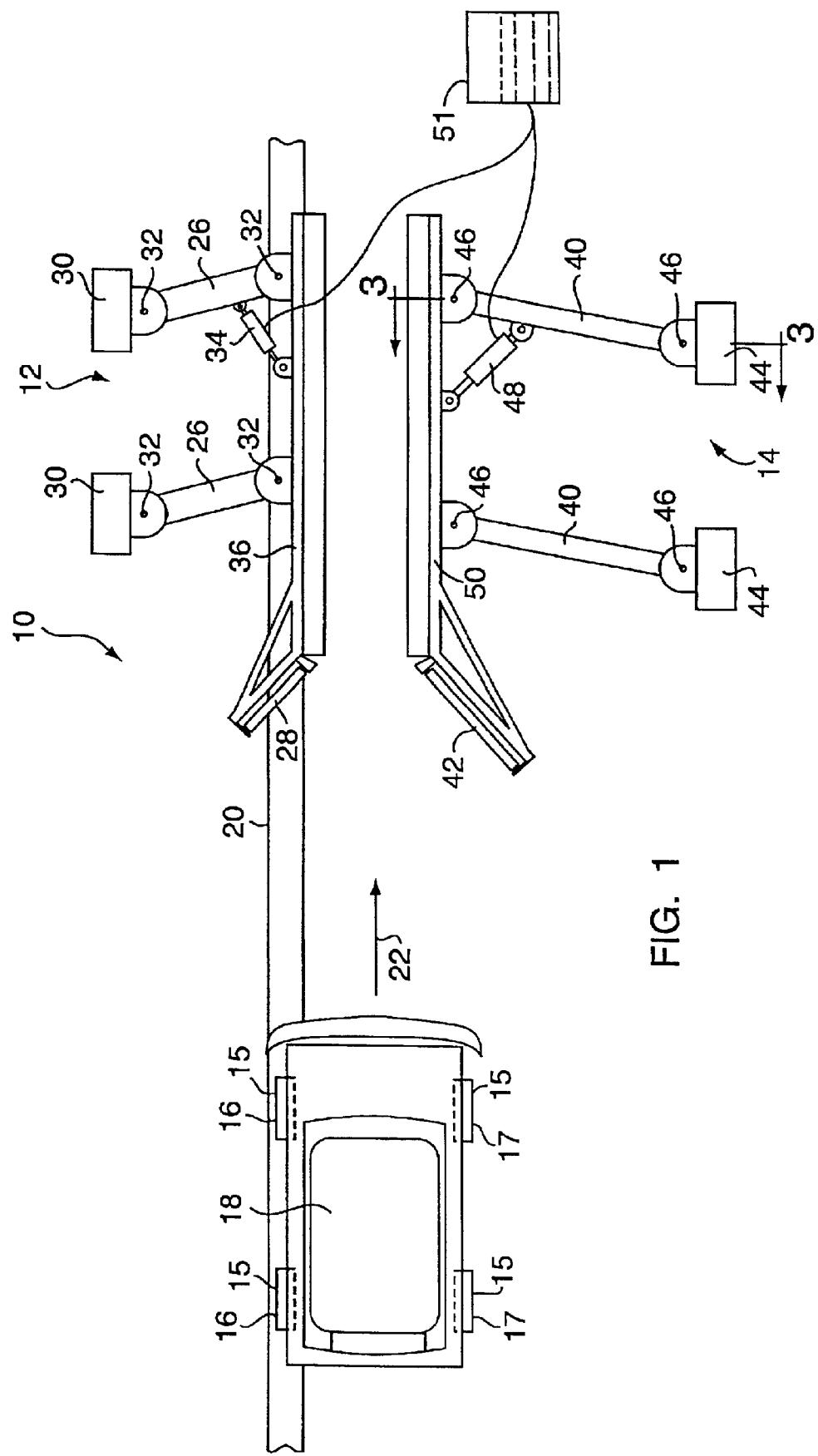
FIG. 1 is a schematic plan view of a tire dressing assembly according to one embodiment of the present invention showing a vehicle moving toward left and right tire dressing applicators.
Figure 2:
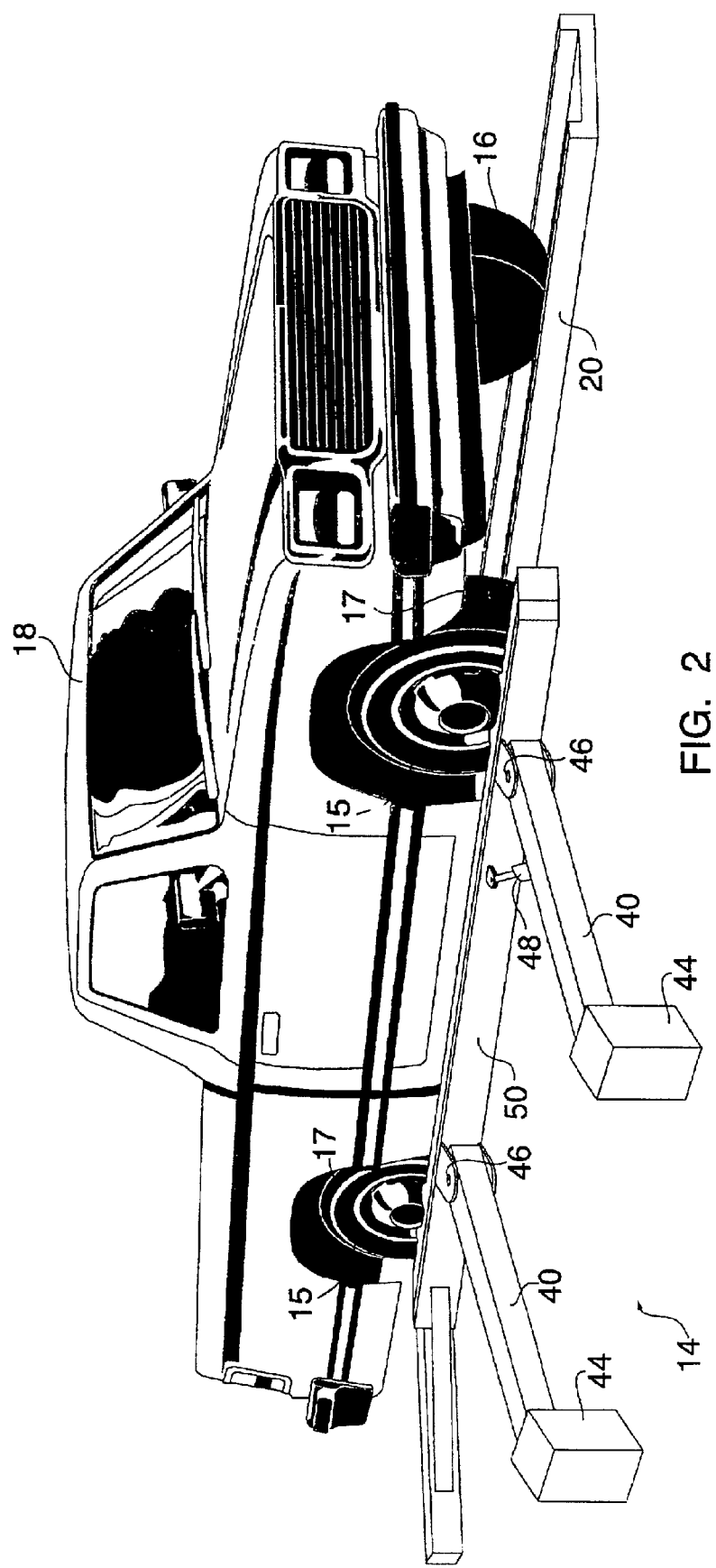
FIG. 2 is a somewhat enlarged, schematic perspective view of the tire dressing assembly of FIG. 1 showing the vehicle engaged with the right tire dressing applicator.

Referring to FIGS. 1–2, a vehicle tire dressing assembly 10 according to one embodiment of the present invention includes a left applicator 12 and a right applicator 14 which cooperate to apply a dressing fluid to sidewalls 15 of left and right tires 16, 17 of a vehicle 18. The vehicle 18 is conveyed along a track 20 of a vehicle washing facility in a direction indicated by arrow 22, the final portion of the washing facility being shown in FIGS. 1 & 2. The track 20 includes an arrangement of components, including a computer control system and conveying equipment (not shown), which are considered well-known in the art. The control system is used by the washing facility to monitor and determine the exact position of the vehicle in the track 20. It is intended that the present invention utilize the existing computer control system of the washing facility to initiate application of the fluid, as will be discussed in detail below.

The left and right applicators 12, 14 are deflected by the vehicle from dormant positions shown generally in FIG. 1 to contacting positions shown in FIG. 2 wherein each applicator 12, 14 automatically positions and adjusts itself to the width of the vehicle into a contacting orientation with the sidewalls of the tires 16, 17. The left applicator 12 moves in response to arrival of the left tires 16, and includes a pair of left swing arms 26, a left deflector roller 28, a pair of anchor posts 30, four pivot assemblies 32, a left cylinder 34, and a left mount bar 36. The pivot assemblies 32 allow the mount bar 36 to maintain a generally parallel relationship with the track 20. The left applicator 12 therefore remains in contacting engagement simultaneously with both left tires 16. Because the left tires 16 are always kept within the track 20, the left applicator 12 can effectively engage the tires with a minimal range of motion. In other words, as known in the industry, the left tires 16 provide a reference point for various mechanisms in the washing facility, including the present invention, which automatically adjusts to various vehicle widths by locating the right side of the vehicle 18.

The right applicator 14 is configured slightly differently from the applicator assembly 12 to articulate and permit passage of vehicle 18 upon arrival of the right tires 17, and includes a pair of right swing arms 40, a right deflector roller 42, a pair of anchor posts 44, four pivot assemblies 46, a right cylinder 48, and a right mount bar 50. The pivot assemblies 46 are identical to pivot assemblies 32 of the left applicator 12, but the swing arms 40 are slightly longer than swing arms 26. With the longer swing arms 40, the applicator 14 articulates in a larger arc compared to the applicator assembly 12. During articulation, the right mount bar 50 maintains a generally parallel relationship to the left mount bar 36 and to the track 20.

The left cylinder 34 is mounted between the left mount bars 36 and one of the swing arms 26, and the right cylinder 48 is mounted between the right mount bar 50 and one of the swing arms 40. Both of the cylinders 34,48 are hydraulically actuated and are positioned so that when they are extended, the applicators 12, 14 are moved into the path of the vehicle being conveyed along the track 20. A fluid reservoir 51 is coupled to each cylinder 34, 48 and is pressurized with air so that the applicators 12, 14 are pressed against the tires with a desired amount of force once the vehicle is moved into engagement with the assembly 10. The pressure in the cylinders 34,48 is adjustable so that the applicators can apply a desired amount of force to the tires by selecting an appropriate level of air pressure.

The left and right deflector rollers 28, 42 are positioned and oriented with respect to the mount bars 36, 50 to allow the vehicle 18 to impact the applicators 12, 14, force the applicators outwardly in a camming action, and allow entry of the vehicle 18 between the applicators. The right roller 42 has a slightly longer length than the left roller 28 to account for various vehicle widths.

Figure 3:
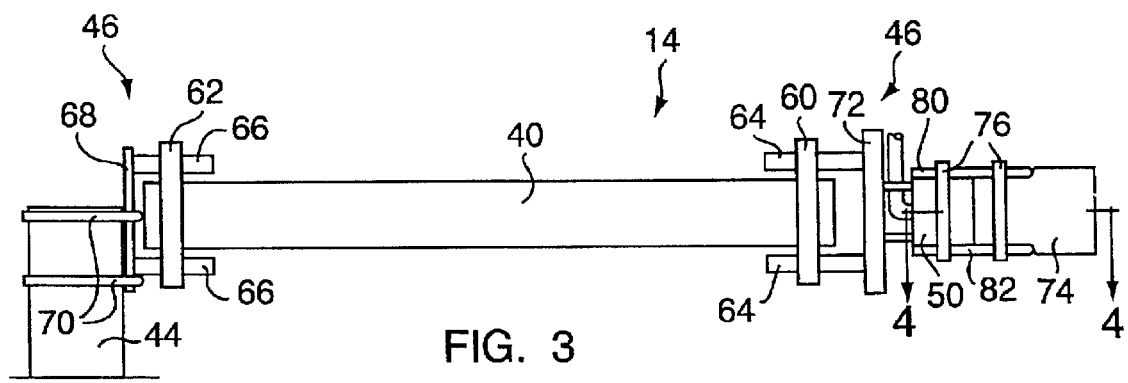
FIG. 3 is a cross-sectional view of the tire dressing apparatus of FIG. 1 taken along the lines 3—3.

Referring to the right applicator 14 shown in FIG. 3, the pivot assemblies 46 connect the swing arm 40 between the anchor post 44 and mount bar 50, and includes inner and outer pivot pins 60, 62, and inner and outer support bearings 64, 66. The outer support bearings are attached to an outer bearing mount 68 which, in turn, is fixed to the anchor post 44 via a pair of U-bolts 70. The U-bolts allow vertical movement of the applicator 14 relative to the ground by loosening the U-bolts 70 and moving the outer bearing mount 68 along the anchor post 44. The outer pivot pin 62 anchors the swing arm to the anchor post. The inner support bearings 64 are attached to an inner bearing mount 72. The inner pivot pin 60 pivotally couples the swing arm 40 to the mount bar 50. The swing arm, mount bar, and anchor post are constructed of aluminum, but these components can be constructed from other structural materials such as steel as long as rapid corrosion is prevented. It should be understood that the left applicator 12 has an arrangement of components that is, except for the length of the swing arms, substantially identical to that of the right applicator 14.

Figure 5:
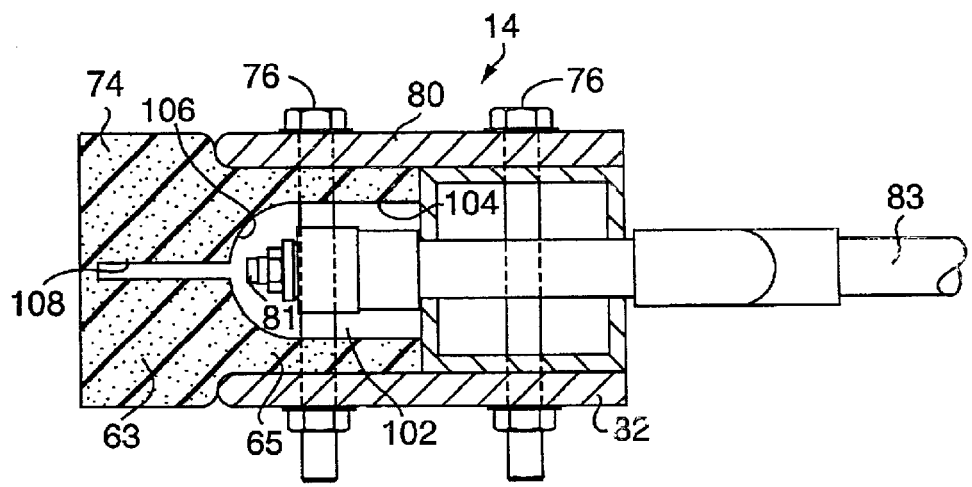
FIG. 5 is a cross sectional view of the tire dressing apparatus of FIG. 4 taken along the lines 5—5 showing the applicator pad clamped between upper and lower mount plates.

Referring to FIG. 5, an elongated applicator pad identified generally with the reference number 74 has a pad body which includes a first portion 63 and a second portion 65. The second portion 65 is bolted to the mount bar 50 via an arrangement of pad mount bolts 76 and upper and lower mount plates 80, 82. The applicator pad 74 is manufactured from either a hydrophobic or hydrophylic foam, depending on whether a solvent-based or a water-based dressing fluid is used. Hydrophobic foam is compatible for use with solvent-based fluid because it will absorb such fluid, and hydrophylic foam is compatible for use with water-based fluid. A benefit of using the hydrophobic foam is that the applicator pad 74 will retain the dressing fluid without absorbing water remaining on the tires from prior washing operations.

The foam is "reticulated," meaning that when manufactured, a known mechanical or chemical process is used to produce an inner arrangement of cells which increase the amount of fluid the foam is capable of retaining. Reticulating the foam also increases the ability of the foam to release the fluid to the tires when required to do so.

Figure 4:
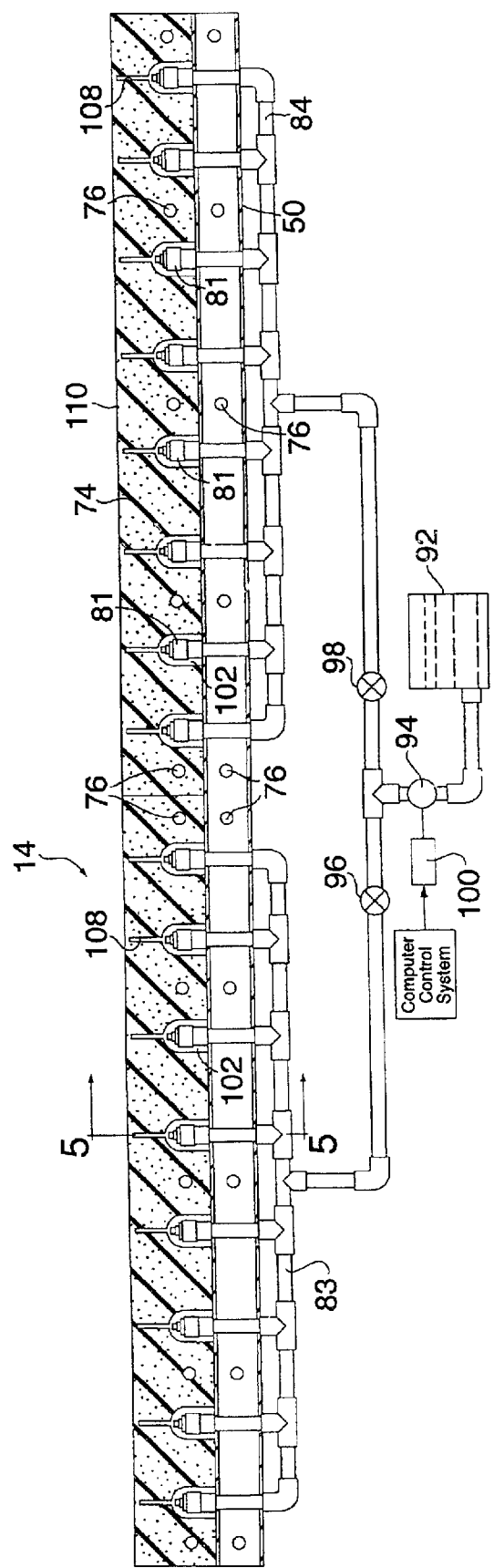
FIG. 4 is a cross sectional view of the tire dressing apparatus of FIG. 3 taken along the lines 4—4 illustrating an arrangement of spray nozzles positioned within an applicator pad.

Referring to FIGS. 4–5, the right applicator 14 includes a quantity of sixteen spray nozzles 81 mounted in an equally-spaced arrangement along the mount bar 50. The spray nozzles 81 are mounted such that they extend through the mount bar 50 and into the applicator pad 74. Each nozzle produces a conical spray pattern so as to effectively spray the fluid into the pad 74. Eight of the spray nozzles 81 are connected to a forward supply line 83 and soak a section of the pad 74 which first comes into contact with the vehicle. The remaining eight spray nozzles 81 are connected to a rear supply line 84. Each of the supply lines 83, 84 is connected to a fluid supply system 90 which can supply either the front eight nozzles 81, the rear eight nozzles 81, or all of the nozzles 81 to spray the fluid.

The fluid supply system 90 includes a reservoir 92 which stores the fluid, a pump 94 which forces the fluid to the spray nozzles 81, and valves 96, 98 which control fluid flow to the front and rear supply lines 83, 84, respectively. A conventional timer 100 provide power to the pump 94, and the timer 100 is triggered or actuated by the computer control system of the washing facility.

The applicator pad 74 is configured with a quantity of sixteen orifices 102 which loosely receive the spray nozzles 81 such that dressing fluid sprayed from the nozzles 81 is dispersed uniformly inside the orifice 102. Each orifice 102 includes a cylindrical portion 104, a concave end 106 and a blind bore or capillary 108 extending from the concave end 106 toward a contact surface 110 of the applicator pad 74. The capillary ends approximately 0.25 inches short of the contact surface 110 so that fluid wicked into the capillary is absorbed by the pad 74.

The dimensions of the contact surface 110 can be optimized according to the size of the tire being dressed and the point at which the pad 74 makes contact with the tires. That is, if the pad 74 contacts the tire in proximity with the area where the tire meets the ground, it is necessary to provide a larger (or taller) contact surface 110 so that the pad 74 coats the entire width of sidewall 15 from the ground to the wheel. On the other hand, if the pad 74 contacts the tire in proximity with the rotational axis of the wheel, then the pad is theoretically capable of contacting the entire sidewall 15 of the tire, regardless of the size of the contact surface 110, due to rotation of the tire.

Figure 6:
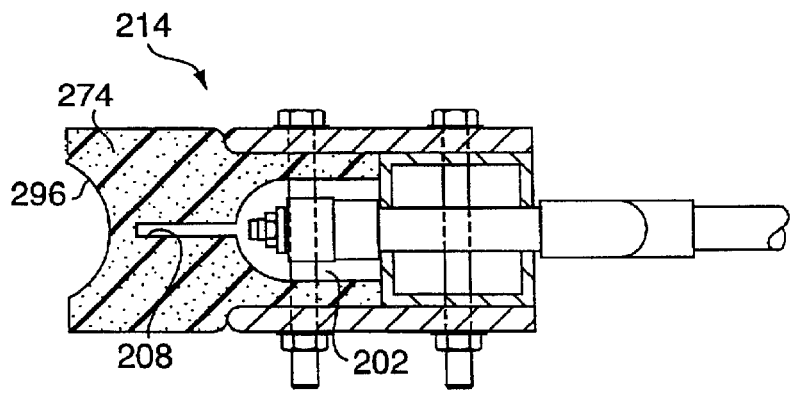
FIG. 6 is a cross sectional view of a second embodiment of the tire dressing apparatus of FIG. 5 reduced slightly in size and showing an applicator pad having a concave contact surface.

Referring to FIG. 6, another embodiment of the right applicator, designated by numeral 214, includes an applicator pad 274 having a concavely-shaped contact surface 296 that conforms to the surface of the tire in a manner different from pad 74. In particular, it can be seen that pad 274 is more readily able to conform the curved surface of the tire and coat the portions of the tire closest the wheel and the tread. The pad 274 has an arrangement of capillaries 208 which extend from the orifices 202 and end short of the contact surface 296.

Figure 7:
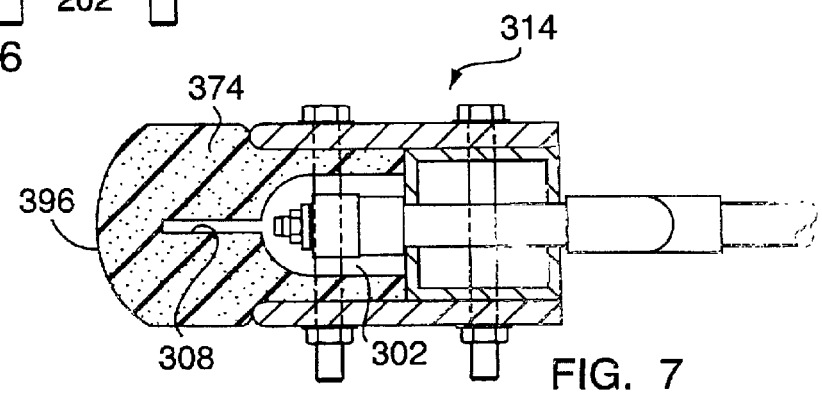
FIG. 7 is a cross sectional view of a third embodiment of the tire dressing apparatus of FIG. 5 reduced slightly in size and showing an applicator pad having a convex contact surface.

Referring to FIG. 7, a third embodiment of the right applicator, designated by numeral 314, includes an applicator pad 374 having a convexly-shaped contact surface 396. The convex shape allows the pad to flex easily upon initially contacting a tire due to the reduced surface area which initially contacts the tire.

Figure 8:
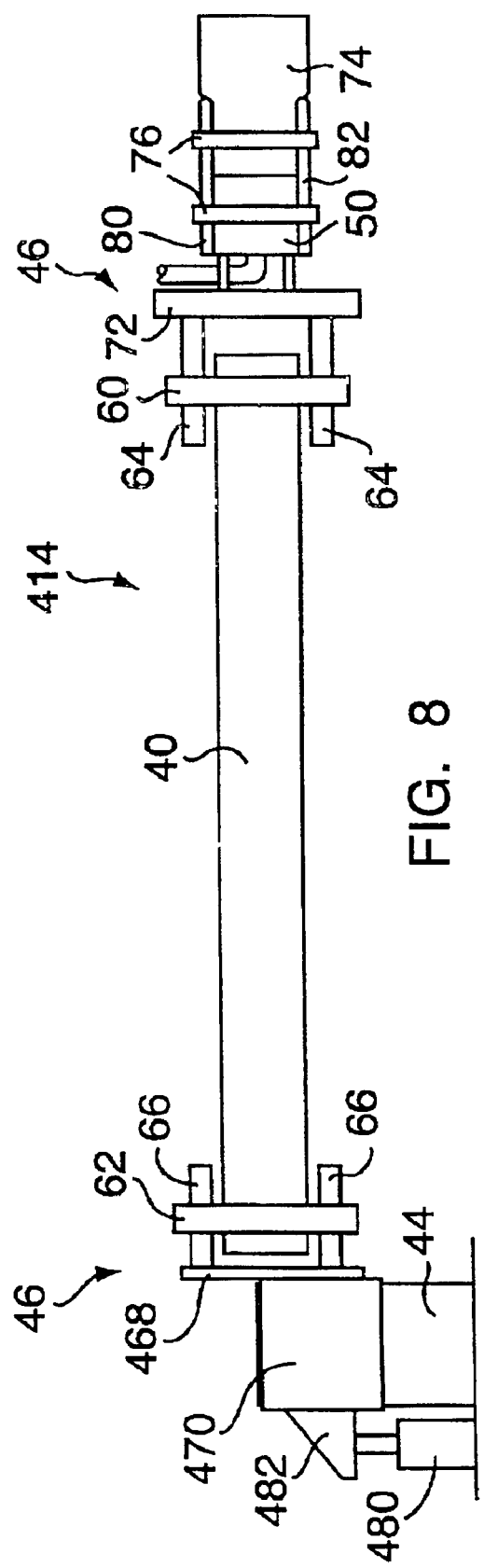
FIG. 8 is a cross-sectional view of a fourth embodiment of the tire dressing apparatus of FIG. 1 taken along the lines 3—3 and showing an applicator moveably coupled to a hydraulic cylinder.

Referring to FIG. 8, a fourth embodiment of the right applicator, designated by numeral 414, includes a sleeve 470 and a means 480, such as a hydraulic or pneumatic cylinder, for driving the sleeve 470 vertically along the anchor post 44. The sleeve 470 is attached with conventional fasteners to an outer bearing mount 468. A tab 482 is attached to the sleeve 470 to receive the means 480. Hence, the vertical position of the applicator 414 can be adjusted as desired by moving the sleeve along the anchor post.

The means 480 is in communication with the computer control system of the washing facility so that the height of the applicator 414 can be adjusted automatically according to the size of the tires being coated, or the height of the body of the vehicle. For a low-profile tire or a vehicle with minimal ground clearance, such as a sports car, it may be desired to lower the applicator as much as possible to avoid rubbing the applicator on the body of the vehicle or the wheels of the vehicle. For vehicles having wheels or hubcaps which protrude outwardly beyond the plane of the tire sidewall, it may be desirable to lower the applicator to avoid possible damage to the applicator.

In operation, when the vehicle arrives at a predetermined location on the track 20 (seen in FIG. 1), a signal is sent from the computer control system to the timer 100 to power the pump 94 for three seconds, thereby pumping fluid to the applicator pads 74. The time period can easily be lengthened or shortened depending on the flow rate of the pump and spray nozzles, or the absorption rate of the pads 74. The pump should be actuated at a position which gives the fluid enough time to soak in thoroughly before the vehicle engages the applicator pads. The valves 96, 98 are actuated individually to control delivery of fluid to either the front or the rear supply line 83, 84, or both simultaneously.

The vehicle is moved into engagement with the applicators 12, 14, and the pads are then pressed against the tires of the vehicle by the force of the pressurized air in cylinder 51. Air pressure in the reservoir 51 is adjusted until the applicator pads are pressed against the tires with a force that deforms and conforms the applicator pads to the contour of the tire sidewalls 15. The efficiency and effectiveness of the applicator pads can be adjusted by raising or lowering the applicators 12, 14 on their respective anchor posts.

While several preferred embodiments of the novel tire dressing assembly have been shown and described above, various modifications and substitutions may be made without departing from the spirit and scope of the invention. For example, other types of foams may be used that compatible other types of fluids, and foam having more or less hardness and/or rigidity may be used. In the event that a water-based fluid is applied to the tires, it may be advantageous to adapt a wiping or drying mechanism to remove as much water from the tires as possible before the pad contacts the tire so that water from the tire is not absorbed by the pad. Such a wiping mechanism can be incorporated into the pad by providing an impermeable layer of material on the upper and/or lower surfaces of the pad so that water is wiped from the tires prior to application of the dressing fluid.

Further, it is considered within the scope of the present invention to configure the applicator pads with other arrangements of capillaries, such as lateral capillaries which connect the spray nozzle orifices to each other, thereby changing the distribution characteristics of the dressing fluid in the pad.

It is also considered within the scope of the present invention to arrange the fluid supply lines and fluid supply system such that dressing fluid is pumped to various arrangements of nozzles within the applicator pad. For instance, it may be desirable to connect each supply line to every other spray nozzle so that one supply line can be deactivated and the applicator pad will still be soaked enough to effect proper tire coating. Other types of spray nozzles can be used to spray the fluid in something other than a conical pattern.

Yet further, it is considered within the scope of the present invention to provide applicators which coat a single tire of the vehicle at a time. Such an applicator is useful in a facility other than a washing facility.

It is also considered within the scope of the present invention to fit the tire dressing assembly with an assortment of differently-sized and/or shaped applicator pads. Each applicator would be capable of automatically selecting an appropriately-sized pad for use based upon input received from the computer control system of the washing facility. With such an arrangement, pads can be sized to accommodate tires having a low profile, or larger tires for vehicles such as pickup trucks. An alternative arrangement is to provide several applicator assemblies adjacent one another, each assembly having applicator pads of a different size. A vehicle being processed can be conveyed to the applicator having the appropriately-sized applicator pads for that vehicle.

Still further, it is considered within the scope of the present invention to utilize the applicator assemblies to apply fluids other than dressings, such as cleaner, before or during the time the vehicle is washed.

Accordingly, it is to be understood that the present invention has been described by way of illustration, and not by way of limitation.

What is claimed is:

1. An applicator pad for use with an apparatus having a spray nozzle for applying a fluid to vehicle tires, the applicator pad comprising:
   a pad body having a first portion which is porous for retaining a fluid;
   a contact surface on said first portion for engaging the sidewall of a tire of a vehicle;
   the pad body also having a second portion connected to said first portion, said second portion for mounting the pad body on the apparatus;
   said second portion defining an orifice for receiving a portion of the spray nozzle when the applicator pad is used with the apparatus; and
   said orifice being in communication with said porous first portion of the pad body and said contact surface such that fluid received in said orifice is absorbed and retained by said first portion and can be applied to the sidewall of a tire by engaging the contact surface with the sidewall of the tire.

2. The applicator pad as defined in claim 1, wherein said second portion of the pad body is mountable and demountable on the apparatus.

3. The applicator pad as defined in claim 1, wherein the contact surface is concave.

4. The applicator pad as defined in claim 1, wherein the contact surface is convex.

5. The applicator pad as defined in claim 1, wherein said first portion of the pad body is foam.

6. The applicator pad as defined in claim 5, wherein the foam is reticulated.

7. The applicator pad as defined in claim 1, wherein said first portion of the pad body is hydrophobic.

8. The applicator pad as defined in claim 1, wherein said first portion of the pad body is hydrophylic.

9. The applicator pad as defined in claim 1, wherein said orifice includes a blind bore ending short of said first portion.

10. The applicator pad as defined in claim 1, wherein said orifice includes a blind bore extending into said first portion and ending short of said contact surface.

11. The applicator pad as defined in claim 1, wherein said orifice further defines a capillary extending into said first portion of said pad body.

12. The applicator pad as defined in claim 1 wherein said pad body is elongated such that the contact surface is engageable with the entire sidewall of a rotating tire mounted on a vehicle, when the pad body is stationary and the vehicle is moving.

13. An elongated applicator pad for use with an apparatus having a plurality of spray nozzles for applying a fluid to vehicle tires, the applicator pad comprising:
    an elongated pad body having a first portion which is porous for retaining a fluid;
    a contact surface on said first portion for engaging the sidewall of a tire of a vehicle;
    the pad body also having a second portion connected to said first portion, said second portion for mounting the pad body on the apparatus;
    said second portion defining a plurality of orifices spaced apart along the length of said pad body, each of the orifices for receiving a portion of one of the spray nozzles; and
    each said orifice defining a blind bore in communication with said porous first portion and said contact surface such that fluid received in said orifices from the spray nozzles is absorbed and retained by said first portion and can be applied to the sidewall of a tire by engaging the contact surface with the sidewall of the tire.

14. The applicator pad as defined in claim 13, wherein said second portion is mountable and demountable on the apparatus.

15. The applicator pad as defined in claim 13, wherein the contact surface is convex.

16. The applicator pad as defined in claim, 13, wherein said second portion defines a plurality of apertures for mounting the pad body to the apparatus.

17. The applicator pad as defined in claim 13, wherein said first portion of said pad body is foam.

18. The applicator pad as defined in claim 17, wherein the foam is reticulated.

19. The applicator pad as defined in claim 13, wherein said first portion of the pad body is hydrophobic.

20. The applicator pad as defined in claim 13, wherein said first portion of the pad body is hydrophylic.

21. The applicator pad as defined in claim 13 wherein each said blind bore extends through said second portion and into said first portion ending short of said contact surface.

22. The applicator pad as defined in claim 13 wherein said pad body further defines lateral capillaries connecting the orifices together, the lateral capillaries for facilitating dispersion of the fluid throughout the first portion of said pad body.

* * * * *

UNITED STATES PATENT AND TRADEMARK OFFICE
CERTIFICATE OF CORRECTION

PATENT NO. : 6,936,104 B2  
DATED : August 30, 2005  
INVENTOR(S) : William M. Gorra It is certified that error appears in the above-identified patent and that said Letters Patent is hereby corrected as shown below:

<u>Title page,</u>
Item [57], ABSTRACT, should read:
-- An applicator pad for use with an apparatus for applying a fluid to the tires of a vehicle. The applicator pad having a pad body which includes a first portion for retaining a fluid, a contact surface on the first portion for engaging a sidewall of the tire, and a second portion connected to the first portion which is adapted to mount the pad body to the apparatus. The applicator pad for applying the fluid to the sidewall of a tire mounted on a vehicle. --.

Signed and Sealed this

Twenty-fifth Day of October, 2005

JON W. DUDAS
*Director of the United States Patent and Trademark Office*